Nov. 13, 1951     C. P. WAGNER     2,574,851
PLUMBING VALVE
Filed June 30, 1948
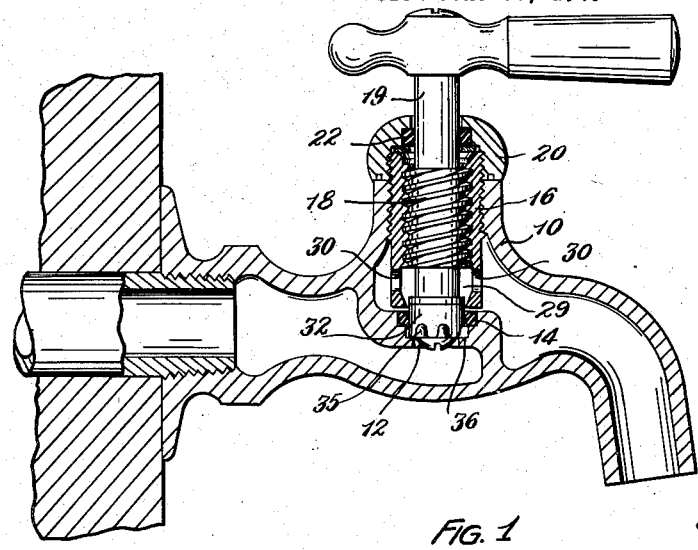
FIG. 1
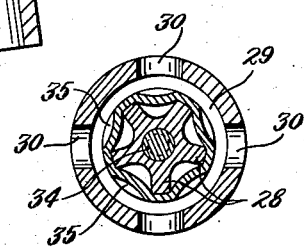
FIG. 4
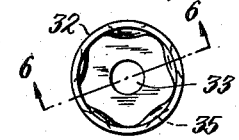
FIG. 5
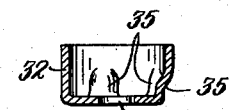
FIG. 6
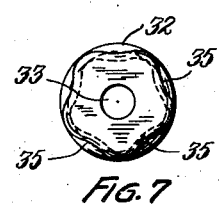
FIG. 7
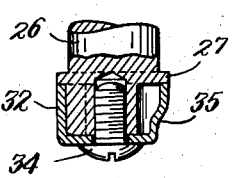
FIG. 3
FIG. 2
INVENTOR.
CLETUS P. WAGNER
BY Hudson, Boughton,
Williams, David & Hoffmann.
ATTORNEYS Patented Nov. 13, 1951

2,574,851

UNITED STATES PATENT OFFICE 2,574,851

PLUMBING VALVE

Cletus P. Wagner, Marysville, Ohio, assignor to H. B. Salter Mfg. Co., Marysville, Ohio, a corporation of Ohio Application June 30, 1948, Serial No. 36,154

4 Claims. (Cl. 251—27)

This invention relates to improvements in plumbing valves, that is to say plumbing valves of the type disclosed in copending application Serial No. 744,588, filed April 29, 1947 by Frank R. Holycross et al., which comprises a body member and a stem member relatively movable in a longitudinal direction, one of said members carrying a compressible O-ring and the other member having ports which are caused to pass through and beyond the sealing line of the O-ring as the valve is caused to move from open to closed position.

In cases where the ports are machined into one of the relatively movable members, the burrs and sharp edges resulting from the machining operation must be removed, as otherwise destructive wear on the O-ring will result. The removal of these burrs and sharp edges is a tedious and expensive hand operation and due to the human element is not always properly performed. In accordance with the present invention the ports are formed otherwise than by a machining operation, and the formation of sharp edges is avoided completely.

One of the objects of the invention therefore is the provision of a plumbing valve of the character stated wherein wear on the O-ring shall be insignificant and the valve may be operated for years without servicing.

Another object is the provision of ports of a character such that the flow of water through the valve may be metered to a nicety, especially throughout the lower range of flow.

Still another object is the provision of a stem having a separate tip portion in which the ports may be economically formed with rounded surfaces exclusively.

Other objects and features of novelty will appear as I proceed with the description of that embodiment of the invention which, for the purposes of the present application, I have illustrated in the accompanying drawing, in which Fig. 1 is an elevational view largely in vertical section of a plumbing fixture having a valve embodying the invention, the valve being shown in closed position.

Fig. 2 is a fragmental similar view on a larger scale, showing the valve in fully open position.

Fig. 3 is a fragmental elevational view of the stem and tip, largely in section.

Fig. 4 is a transverse sectional view taken substantially on the line 4—4 of Fig. 2.

Fig. 5 is a plan view of the cup shaped tip, looking into its open end.

Fig. 6 is a vertical sectional view taken substantially on the line 6—6 of Fig. 5, and Fig. 7 is a bottom plan view of the tip.

In the drawing there is shown a cast valve body 10 of conventional form, having a horizontal partition wall 11 with a water passage 12 therethrough. The upper end of this passage is enlarged to provide an annular recess 13 in which is seated a soft rubber O-ring 14.

An upwardly extending portion of casting 10 is threaded at 15 to receive a threaded hollow insert 16 which in effect constitutes part of the valve body. This insert extends down to a level just above the partition 11 in order to substantially confine O-ring 14 in recess 13. The inner surface of insert 16 is formed with coarse threads 17 to receive the correspondingly threaded surface 18 of stem 19. Rotating the stem clockwise as viewed from above moves it downward toward closed position of the valve.

The threaded portion of insert 16 extends above casting 10 a distance sufficient to receive and firmly hold a collar 20 in which there is a recess 21 for the accommodation of a second O-ring 22, which serves as a seal and a non-metallic bearing for stem 19. A second recess 23 of somewhat larger diameter receives a metal washer 24 which is locked in place against insert 16 by the collar 20 and serves to prevent substantial movement of ring 22 longitudinally of the stem.

Below the threads 18 the stem has a constricted portion 26 which ends in an annular rib 27, and below this rib there is a spider comprising a plurality of radial arms 28, see Fig. 4. Below the coarse threads 17 of the insert, the latter is hollowed out to provide an annular chamber 29, from which a plurality of passages 30 extend radially outward into the delivery side of the faucet.

On the lower end of the stem there is mounted a tip 32, the upper portion of which is flush with the annular rib 27 and seats against that rib. In the illustrated case this tip is formed as a sheet metal stamping. It may be constructed also as a die casting if desired. When made as a stamping it is generally cup-shaped, and the base of the cup is perforated at 33 so that a machine screw 34 may be projected through the perforation and threadably mounted in the end of the stem, as indicated in Fig. 3.

Projecting backwardly from the base of the tip 32 there are a series of evenly spaced flutes 35 which have their greatest cross-sectional area at the bottom and taper off gradually toward the top, the flutes running out onto the cylindrical surface of the tip well below the upper edge thereof, as illustrated particularly in Figs. 2, 3 and 6. The number of flutes 35 is the same as the number of spider arms 28, and when the tip is slipped onto the lower end of the stem in assembly each of the spider arms 28 is caused to enter the tip between adjacent flutes 35, whereby the tip is locked against rotation on the stem. This arrangement provides a rigid mounting for the tip and at the same time prevents the latter from turning on the stem and thereby tending to loosen screw 34.

The surfaces of the flutes are rounded and no sharp edges are presented to the O-ring 14 as the tip moves downwardly in a spiral path through the O-ring. The making of the tip as a stamping lends itself well to the requirement for smooth rounded surfaces where the flutes merge with the cylindrical surfaces of the tip. A similar effect can be obtained by making the tip as a die casting. In the latter event the walls of the tip would be somewhat thicker and the means for preventing rotation on the stem would be different from that illustrated. The formation of the tip by stamping or die casting are specific examples of what may be generally described as molding. Molding provides smooth rounded surfaces without grinding or polishing. The movement of the stem downward is limited by the engagement of the end of the tip with a shoulder 36 in the passage 12 through the partition 11.

With the valve in the open position illustrated in Fig. 2, water is free to flow upwardly through passage 12, through the flutes 35 into chamber 29 and out through passages 30 into the delivery side of the faucet. The flutes of course act as ports permitting the flow of water between the tip 32 and the O-ring 14. Now, as the operator turns stem 19 clockwise, as viewed from above, the flutes 35 travel downward through the sealing line of ring 14, thereby gradually decreasing the size of the passages at the sealing line of the ring, until finally the flutes pass completely through this line or plane, and the O-ring rides onto the completely cylindrical surface above the flutes, as in Fig. 1 of the drawing. The flow of water from the intake to the delivery side of partition 11 is thus completely cut off and the valve is closed.

Having thus described my invention, I claim:

1. In a plumbing fixture, a valve comprising a body member, a stem movable endwise in said body member, a separable molded tip for said stem, means for detachably mounting said tip on the end of the stem, said tip having lengthwise flutes extending backwardly from the end of the tip, said flutes merging with the cylindrical wall of the tip by means of curved surfaces exclusively, and a compressible O-ring in the body member constrained against material movement longitudinally of that member and adapted to closely engage the cylindrical surfaces of said tip, whereby wear on the ring due to relative movement of the ring and tip is reduced to a minimum.

2. In a plumbing fixture, a valve comprising a body member, a stem movable endwise in said body member, a cup-shaped tip for said stem, said tip consisting of a sheet metal stamping having endwise flutes therein extending backwardly from the end of the tip and merging smoothly with the cylindrical surface of the tip, a compressible O-ring in the body member constrained against material movement longitudinally of that member and adapted to closely engage the cylindrical surfaces of said tip, whereby wear on the ring due to relative movement of the ring and tip is reduced to a minimum.

3. In a plumbing fixture, a valve comprising a body member, a stem movable endwise in said body member, a separable molded tip for said stem, said tip having lengthwise flutes extending backwardly from the end of the tip, said flutes merging with the cylindrical wall of the tip by means of curved surfaces exclusively, said tip having a hole in its end, a fastening extending through said hole and threadably mounted in said stem, means for preventing rotation of the tip on the stem, and a compressible O-ring in the body member constrained against material movement longitudinally of that member and adapted to closely engage the cylindrical surfaces of the tip, whereby wear on the ring due to relative movement of the ring and tip is reduced to a minimum.

4. In a plumbing fixture, a valve comprising a body member, a stem movable endwise in said body member, a cup-shaped tip for said stem, said tip consisting of a sheet metal stamping having endwise flutes therein extending backwardly from the end of the tip, said flutes merging with the cylindrical wall of the tip by means of curved surfaces exclusively, said tip having a hole in its end, a fastening extending through said hole and threadably mounted in said stem, said stem having ribs entering the spaces between flutes for preventing rotation of the tip on the stem, and a compressible O-ring in the body member constrained against material movement longitudinally of that member and adapted to closely engage the cylindrical surfaces of the tip, whereby wear of the ring due to relative movement of the ring and tip is reduced to a minimum.

CLETUS P. WAGNER.

REFERENCES CITED

The following references are of record in the file of this patent:

UNITED STATES PATENTS

| Number | Name | Date |
|---|---|---|
| 558,034 | Brown | Apr. 14, 1896 |
| 963,215 | Eggleston | July 5, 1910 |
| 1,667,999 | Appleton | May 1, 1928 |
| 2,326,825 | Bucknam | Aug. 17, 1943 |
| 2,360,733 | Smith | Oct. 17, 1944 |